United States Patent [19]

Seto et al.

[11] Patent Number: 4,912,770
[45] Date of Patent: Mar. 27, 1990

[54] METHOD OF DETECTING CHANGE USING IMAGE

[75] Inventors: Youichi Seto, Hadano; Fuminobu Komura, Yokohama, both of Japan

[73] Assignee: Hitachi, Ltd., Tokyo, Japan

[21] Appl. No.: 117,286

[22] Filed: Nov. 4, 1987

[30] Foreign Application Priority Data

Nov. 7, 1986 [JP] Japan .................................. 61-263690

[51] Int. Cl.$^4$ .............................................. G06K 9/00
[52] U.S. Cl. ........................................ 382/17; 382/44; 358/109; 358/105
[58] Field of Search ........................... 382/44, 17, 1, 6; 358/105, 109

[56] References Cited

U.S. PATENT DOCUMENTS

| | | | |
|---|---|---|---|
| 4,227,211 | 10/1980 | Disbrow | 358/109 |
| 4,513,438 | 4/1985 | Graham et al. | 382/44 |
| 4,590,607 | 5/1986 | Kauth | 382/44 |

OTHER PUBLICATIONS

"Manual of Remote Sensing", 2nd Edition, 1983, pp. 1612-1621.

Primary Examiner—Leo H. Boudreau
Assistant Examiner—Yon Jung
Attorney, Agent, or Firm—Fay, Sharpe, Beall, Fagan, Minnich & McKee

[57] ABSTRACT

A method of detecting a change using an image includes an image inputting section, an image registration processing section, a binarization processing section and an image display section. In this method, images taken at different times are input, and any change in corresponding pixels in the input images are detected. The change detecting method includes a step of calculating differences in vectors of a plurality of images which are based on different image characteristics, and a step of extracting values of shape features of an object, so that the direction in the change that takes place in the image characteristics of the object is calculated for each image characteristic being observed, shape feature values of the object are calculated, and the calculated direction and shape feature values are compared with corresponding training data, so as to detect the change in the object.

3 Claims, 6 Drawing Sheets

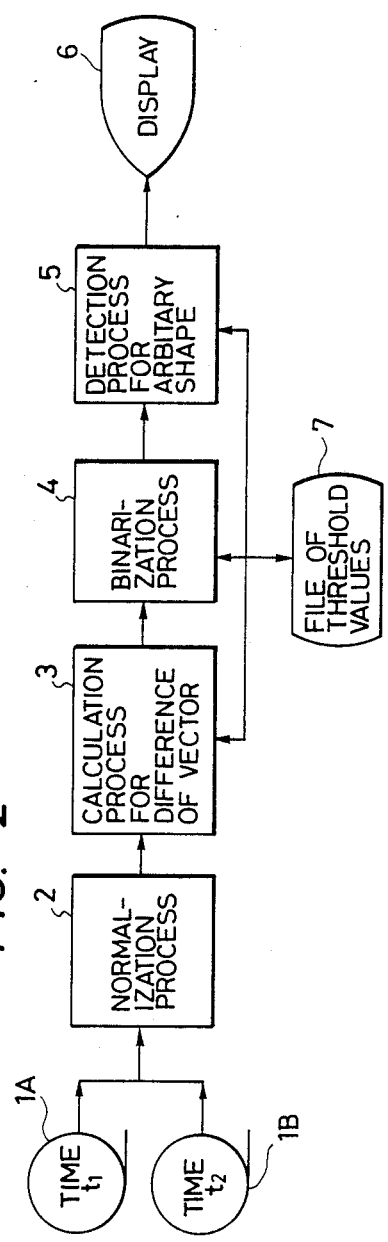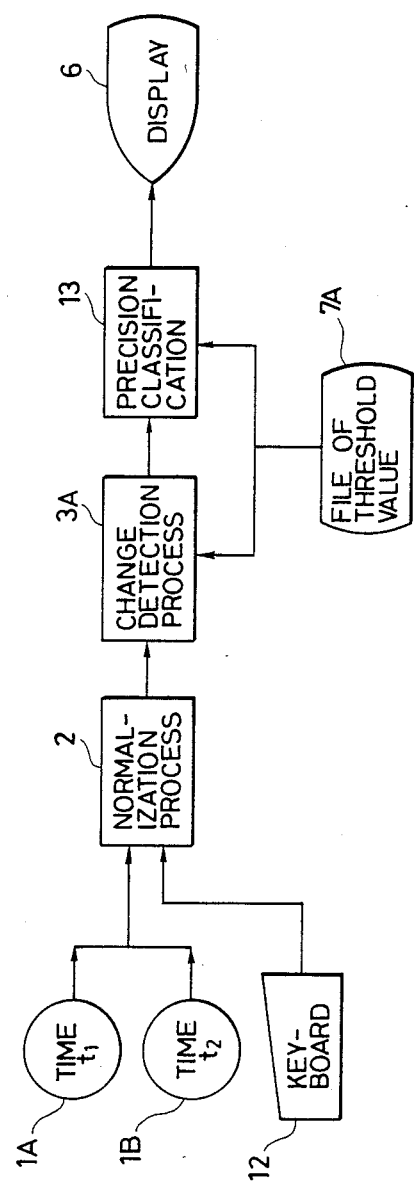

FIG. 7
(a) 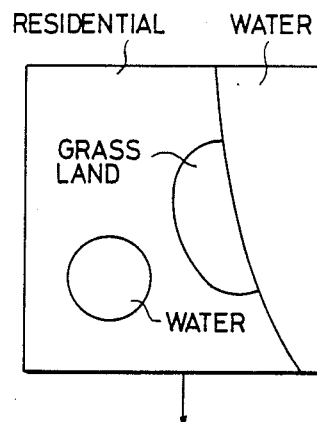
(b) 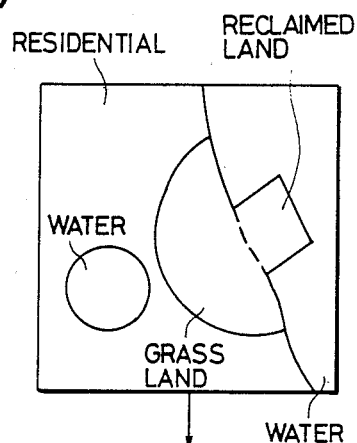
(c) 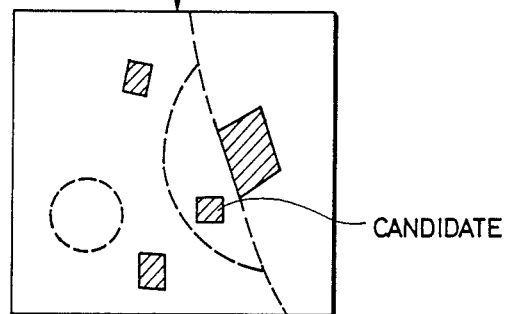
CANDIDATE
(d) 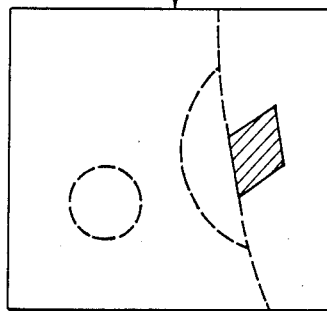

METHOD OF DETECTING CHANGE USING IMAGE

BACKGROUND OF THE INVENTION

The present invention relates to a method of detecting change using an image. More specifically, the present invention pertains to a method of detecting change in an arbitrary object using an image which is utilized in detecting changes in objects whose image characteristics change with time, like the wavelength characteristics with respect to a multispectral image, or relaxation times with respect to an NMR image.

Conventional change detection methods that utilize an image are limited to detection of changes on the basis of detecting the magnitude of change in spectral (wavelength or spectrum) vectors of two multitemporal images, and do not involve the detection of the direction of the change that takes place in such spectral vectors. Such detection methods have, for example, been proposed in "Change Detection of Land Coverage Using Landsat MSS Image" by Ioka et al which are on page 1280 to 1290 of the Proceedings of the 31st Japanese Conference of the Information Processing Society, "Manual of Remote Sensing", 2nd edition, 1983 from page 1612 to page 1602, and "Image Processing and Analysis", Kyoritsu Shuppan, 1981 from page 166 to page 184.

The conventional techniques do not take into consideration the wavelength characteristics which are specific to an object or data on the shape of the object, and suffer from poor detection accuracy when detecting changes in specific substances from time series image data.

SUMMARY OF THE INVENTION

Accordingly, an object of the present invention is to provide a method of detecting a change using an image which is capable of detecting the contents of a change in the object with high accuracy.

To achieve the above-described object, the present invention provides a method of detecting a change using an image which inputs images taken at different times and detects a change in corresponding picture elements in the input images, a system which could employ the change detecting method includes an image inputting section, an image registration processing section, a binarization processing section, and an image display section. The improvement comprises the inclusion of a step of calculating differences in vectors of a plurality of images which are based on different image characteristics, and a step of extracting values representing the shape features of an object, so that the directions of a change in the image characteristics of the object are calculated for each image characteristic, shape feature values of the object are calculated, and the calculated data are compared with corresponding training data.

The method of detecting a change in an object by using an image according to the present invention is divided into at least the following two steps:

(1) Directions of change in the image characteristics of the object are calculated for each type of image characteristic, and the calculated directions are compared with corresponding training data.

(2) Shape feature values of the object are calculated, and the calculated feature values are compared with corresponding training data.

The training data relating to image characteristics which are used in step (1) are prepared by measuring, on known objects, an image provided using a sensor having the same image characteristics as those of the image which is used, for each object and each type of image characteristic. The training data relating to shape characteristics which are used in step (2) are prepared by calculating feature values such as area and complexity, using prior information of objects to be detected, e.g., data on the area of a changed region and the shape thereof, and by converting them into picture elements of the image used.

For step (1), directions of change in the spectral characteristics of the object are calculated for each wavelength component as described below:

As shown in FIG. 3, which is a chart of visible-light and near-infrared spectral characteristics obtained by a thematic mapper sensor, the change from water 8 to soil 10 is positive at bands 1 to 7, and the magnitudes of change at bands 3 to 5 are large, compared with those at other bands. The change from soil 10 to grass 9 is positive at band 4, while that at other bands is negative and the magnitude of change is large at band 3, when compared with that at other bands.

Thus, since the spectral characteristics of objects are specific to each object, if the directions and magnitudes of changes in the spectral characteristics of multitemporal objects are calculated for each wavelength band, and if the calculated directions and magnitudes are compared with those of previously obtained training data, only objects whose spectral characteristics have changed can be detected.

The shape feature values of objects are calculated in step (2) as follows: if areas which have changed into a stadium are to be detected, prior information on an object, e.g., prior shape information on the stadium, such as the area and complexity of the stadium, are compared with those obtained from known training data, so as to ensure that any noise generated in the results of step (1) is removed, and that changed objects are detected with a higher accuracy.

BRIEF DESCRIPTION OF THE DRAWINGS

FIG. 2 is a schematic diagram of the image analyzing system of FIG. 1;

FIG. 6 is a schematic diagram of an image analyzing system, showing another embodiment of the present invention;

FIG. 7 shows resultant images processed by the second embodiment; and

DESCRIPTION OF THE PREFERRED EMBODIMENTS

Figure 1:
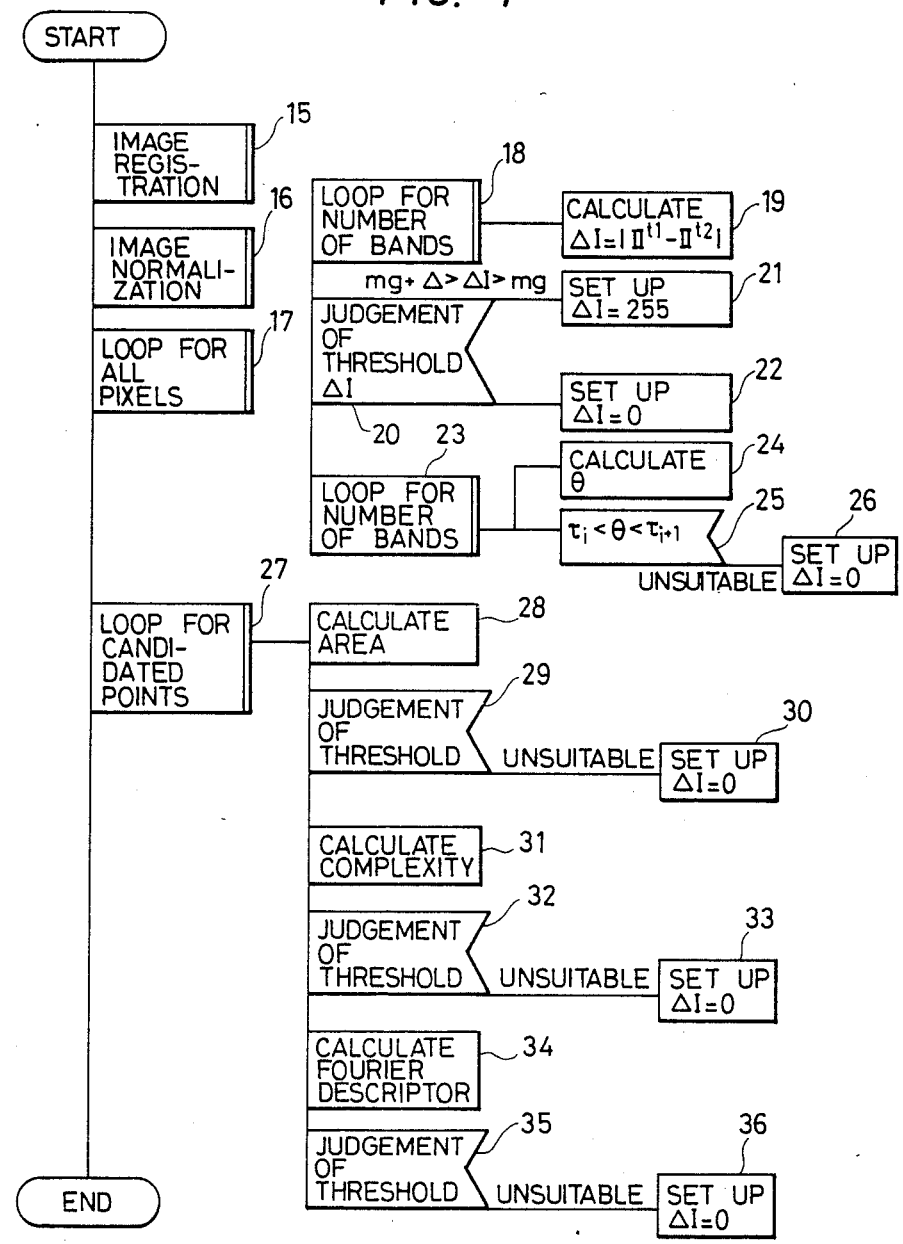
FIG. 1 is a flowchart of the functions of an image analyzing system, showing a first embodiment of the present invention.
Figure 3:
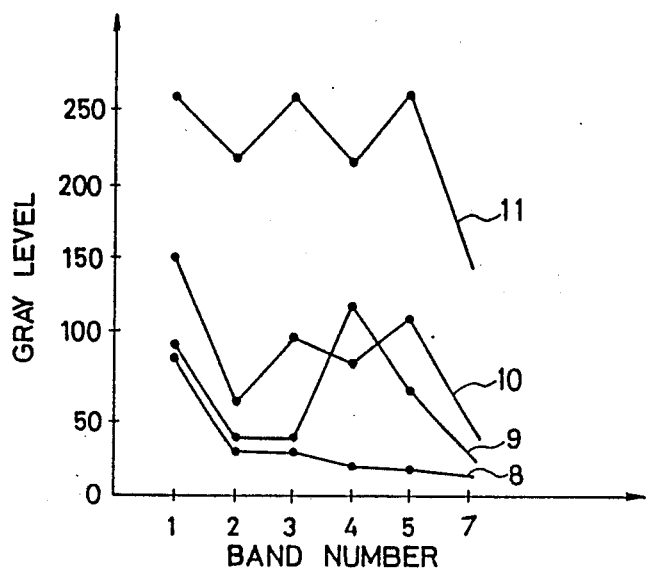
FIG. 3 shows visible-light/near-infrared spectral characteristics obtained by a thematic mapper sensor.

FIG. 2 is a schematic diagram of an image analyzing system used for detecting changed areas on the ground from multitemporal satellite images. In the figure, reference numerals 1A and 1B denote data of satellite images taken at times $t_1$ and $t_2$ ($t_1 \neq t_2$), respectively; 2 denotes image registration and normalization processes; 3 denotes a process for calculating a difference in vectors; 4 denotes a binarization process; 5 denotes a process for detecting a specific shape; 6 denotes a display device; and 7 denotes a file of threshold values.

Visible-light/near-infrared bands (Bands 1 to 5, and 7) of images obtained by the thematic mapper sensor incorporated in Landsat are used as satellite images.

FIG. 1 is an operational flowchart, showing the functions of the system of FIG. 2 in detail. The operation of the first embodiment will now be described below with reference to FIGS. 1 and 2.

(A) Image normalization process 2

Even if no change takes place on the ground, the satellite images taken at times $t_1$ and $t_2$ ($t_1 \neq t_2$) differ owing to changes in radiant intensity and shape distortion caused by various factors such as the amount of vapor in the atmosphere, the altitude of the sun, and the orbit or orientation of the satellite. Therefore, process of registering the two images and normalizing the radiant intensities thereof are necessary. The image registration process (process 15) and the image normalization process (process 16) are performed in the manner described on pages 166 to 184 of "Image Processing and Analysis".

First, image registration is done as described below:

The coordinates of corresponding points in the image taken at time $t_1$ and the image taken at time $t_2$ are obtained, and the obtained coordinates are labeled $(x_i, y_i)$ and $(u_i, v_i)$, where i is the number of corresponding points. Next, the geometric coordinate relation between the images taken at $t_1$ and $t_2$ are obtained by performing least square polynominal fitting on the coordinates of the corresponding points, as follows:

$u = f(x, y)$
$v = g(x, y)$ where f and g are functions which express the geometric coordinates of the two images.

Subsequently, one set coordinates of the two images is superimposed on the coordinates of the remaining image, using their geometric coordinate relation. For example, if the time $t_2$ image is to be superimposed on the time $t_1$ image, the coordinates (u, v) of the image at time $t_2$ which correspond to the coordinates (x, y) of the time $t_1$ image are obtained from the above equations. Since the coordinates (u, v) are not at integral positions, the gray level value of the time $t_2$ image is obtained by means of interpolation. The above-described processing is done for all the points in the images so as to complete the registration of the time $t_1$ and time $t_2$ images.

Subsequently, the normalization process is performed as described below:

The normalization process is done to correct for atmospheric conditions prevailing at the times when multitemporal images are taken.

This is performed by using a reflecting object having a known gray level value on the ground and by adjusting the gray level values of the known reflecting object in the time $t_1$ and time $t_2$ images.

If the time image is to serve as a standard, the gray level value of the known reflecting object in each image is measured. The difference between the measured gray level values is regarded as the atmospheric effect component of the time $t_2$ image, and the difference in gray level values is deducted from the time $t_2$ image to remove the atmospheric effect component therefrom.

(B) Process for calculating vector difference 3

A radiant intensity II of the coordinates (x, y) at time $t_1$ is expressed by:

$$II^{t1}(x, y) = (I_1^{t1}, I_2^{t1}, I_3^{t1}, I_4^{t1}, I_5^{t1}, I_6^{t1})^T \quad (1)$$

In the same way, the radiant intensity II of the coordinates (x, y) at time $t_2$ is expressed by:

$$II^{t2}(x, y) = (I_1^{t2}, I_2^{t2}, I_3^{t2}, I_4^{t2}, I_5^{t2}, I_6^{t2})^T \quad (2)$$

Figure 4:
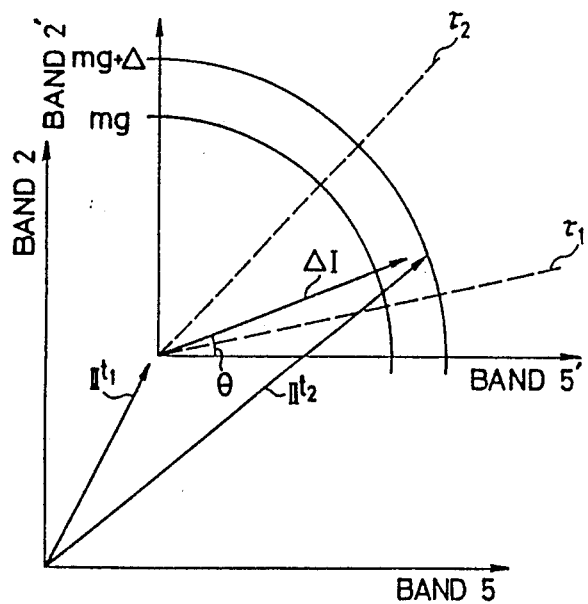
FIG. 4 shows the magnitude of difference in vectors of multitemporal, multispectral images.

The magnitude (absolute value) $\Delta I$ of the difference between the vectors of the multitemporal multispectral images is obtained by the following equation and is shown in FIG. 4 (processes 18 and 19):

$$\begin{aligned} \Delta I(x, y) &= |M(x, y)| \\ &= |II^{t2}(x, y) - II^{t1}(x, y)| \end{aligned} \quad (3)$$

where T means transform.

(C) Binarization process 4

Next, a thresholding process is conducted on $\Delta I$ (process 20).

If $m_g < \Delta I \leq m_g + \Delta$, where $m_g$ is the threshold value, and $\Delta$ is variation amplitude, Then $\Delta I$ of the corresponding pixel: = Changed Else $\Delta I$ of the corresponding pixel: = Not changed  (4)

If a change has occurred, $\Delta I$ is set to 255; if no change has occurred, $\Delta I$ is set to 0 (processes 20 to 22).

Figure 5:
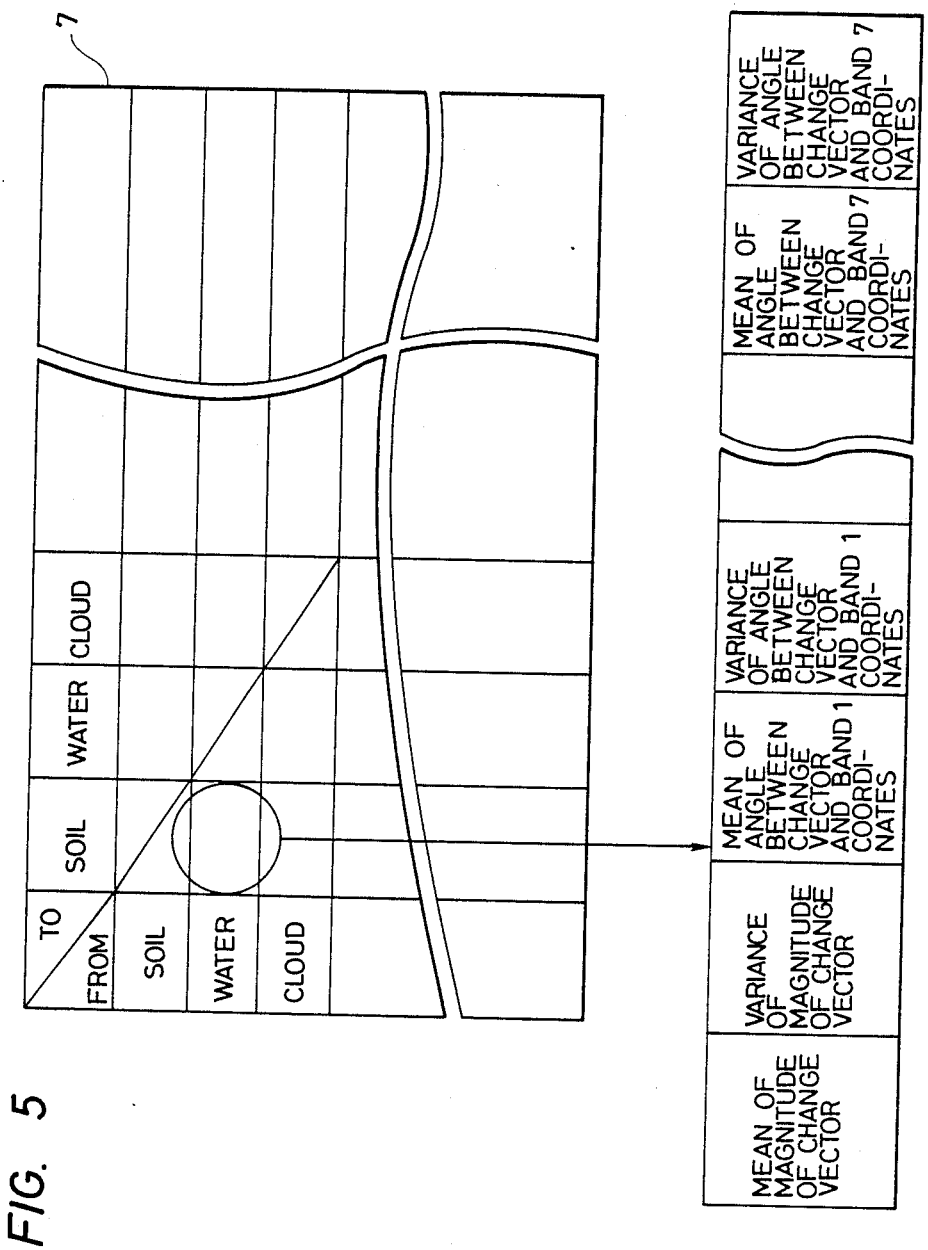
FIG. 5 shows one example of the contents of a threshold value file.

The threshold value $m_g$ and variation amplitude are obtained from known detail data (training data) for each ground object, and are stored in the threshold value file 7 beforehand. FIG. 5 shows one example of the contents of the threshold file 7.

Threshold values $T_1, T_2, \ldots$ used for identifying the presence of clouds are similarly obtained from known training data for each band, and are stored in the threshold value file 7. If a radiant intensity is greater than $T_1, T_2, \ldots$, it is judged that there is cloud, and that change is differentiated from that of the ground object.

After the judging process 20 based on the magnitude of the change has been conducted, only those of the spectral components which have changed in a specific direction are extracted. For example, if a water area 8 has changed to soil 10, the change is small at band 2 but large at band 5. When the angle representing the direction of change is $\theta$ in two-dimensional coordinate derived from bands 2 and 5:

If $\tau_1 < \theta \leq \tau_2$

Then a change in the corresponding picture
  element = from a water area to soil has taken place  (5)

The threshold values $\tau_1, \tau_2$ are obtained from the known training data for each type of change of ground objects by the following Equations. When the mean of the change vector from water to soil in the (2, 5) coordinate system is $\theta_0$ and the variation amplitude is $\Delta\theta$:

$\tau_1 = \theta_0 - \Delta\theta$ $\tau_2 = \theta_0 + \Delta\theta$  (6)

The angle $\theta$ representing the direction of the change is expressed by:

$$\theta = \cos^{-1}\left(\frac{M \cdot e_5}{|M| \cdot |e_5|}\right) \quad (7)$$

Where M is the difference in vectors ($=II^{t2}-II^{t1}$) of the object, $e_5$ is a unit vector in the band 5 direction, and $\cdot$ is an internal vector product operator.

The (2, 5) coordinate axes are those of the coordinate system in which $II^{t1}$ is the origin.

If Equation (5) is not satisfied, it is judged that change is not the one of a specific object, and that area is regarded as a non-changed area. $\Delta I$ of the non-changed area is set to 0. In actual operation, the processes expressed by Equations (5) to (7) are performed for all combinations of the input bands (processes 23 to 26).

(D) Process for detecting specific shape 5

Data representing shape is used (process 27) after detection of a specific object has been conducted using spectral components. For example, if a stadium is to be detected, an elliptic shape could be detected. In such a case, an area A, a perimeter P, a complexity $P^2/A$, or a Fourier descriptor $A_n$ for an even complicated shape, are used as shape feature values.

These feature values are calculated as described below:

(i) Calculation of area A (process 28)

The number of pixels having a gray level of 255 are calculated for each candidate area in the binary image.

(ii) Calculation of complexity $P^2/A$ (process 31)

The number of pixels having a gray level of 255 are calculated as a perimeter P around the contour which forms the boundary between pixels having a gray level of 255 and pixels having a gray level of 0 in each candidate area.

$P^2/A$ is calculated from the area A and the perimeter P obtained for each candidate area.

(iii) Calculation of Fourier descriptor $A_n$ (process 34)

From an apex angle $\Delta\phi_n$ of a vertex of a m-sided polygon and a side $l_m$:

$$a_n = \frac{-1}{n\pi} \sum_{k=1}^{m} \Delta\phi_k \sin\frac{2\pi n l_k}{L} \quad (8)$$

$$b_n = \frac{1}{n\pi} \sum_{k=1}^{m} \Delta\phi_k \cos\frac{2\pi n l_k}{L} \quad (9)$$

where $L = \sum_{k=1}^{m} l_k$.

The Fourier descriptor is obtained from the above equations as described below:

$A_n = (a_n^2 + b_n^2)$, where n is the degree of the Fourier descriptor.

If the thus-obtained shape feature value is B, the specific shape alone can be detected by judging the binary image $\Delta I$ using the following inequality (processes 29, 32, and 35):

If $D < B < D+d$,

Then, B: =detected as specific object (=255),

Else B: =not detected as specific object (=0) (10)

where D is a shape feature value obtained from training data and d is a variation value, and D and d are stored in the threshold value file 7.

In this embodiment, only objects which have changed in a specific manner can be detected with high accuracy from the time series images, while differentiating clouds from the change on the ground, by using the spectra and shape feature values.

In this embodiment, first, the spectral data on an object image then the shape data thereon are processed in that order. However, after a candidate area is selected using the shape data on the changed image, the change in a specific object may be detected using spectral data.

FIG. 6 shows a schematic view of an image analyzing system, showing a second embodiment of the present invention. In this embodiment, the detection technique of the previous embodiment is applied to the detection of changes in a specific substance by classifying images into categories of objects and then comparing two classified images, thereby improving the efficiency of classification process.

More specifically, in the first step of this embodiment, the technique shown in the previous embodiment is used to detect candidate points which are thought to have changed from a previous image using the magnitude and direction of changes in spectral characteristics, and a statistical classification process is then employed in the second step to determine whether or not the thus-obtained candidate points are pre-defined objects.

This statistical classification process employs Mahalanobis' generalized distances which represent similarity (distance) to categories, by virtue of probability distribution of data. In this process, these Mahalanobis' generalized distances are compared with threshold values on the distances which have been registered beforehand. These threshold values are prepared by obtaining Mahalanobis' generalized distances from the image data on the known objects and by experimentally determining the optimal values.

The above-described operations are described in further detail below.

In the first step, points whose $\Delta I$ and $\theta$ respectively satisfy the conditions expressed by Equations (4) and (5) are selected as candidate points. Since the starting point $II^{t1}$ and the terminating point $II^{t2}$ of the vector of each of the calculated candidate points have not been determined, possibility of erroneous detection of an object other than a pre-defined object is high.

Therefore, statistical classification process is then conducted on the thus-calculated candidate points so as to determine with high accuracy whether or not the candidate points belong to the category of the specific object. Determination is done as described below:

Assume that a portion which has changed from category c1 to category c2 is to be detected using the radiant intensities $II^{t1}$ and $II^{t2}$ of the pixels of the candidate points in the images taken at time $t_1$ and $t_2$ and the variance/covariance inverse matrix of each category $$\overset{-1}{\underset{c}{\Sigma}},$$

mean $\mu^c = (\mu_1^c, \mu_2^c, \ldots, \mu_i^c)^T$ (where c is a category, and T means transform).

First, Mahalanobis' generalized distance from each category is obtained as follows:

$$D_{t1}^2 = (II^{r1} - \mu^{c1})^T \underset{\text{water}}{\Sigma^{-1}} (II^{r1} - \mu^{c1}) \quad (11)$$

$$D_{t2}^2 = (II^{r2} - \mu^{c2})^T \underset{\text{water}}{\Sigma^{-1}} (II^{r2} - \mu^{c2}) \quad (12)$$

It is then determined whether or not the calculated Mahalanobis' generalized distances are within the classifying threshold values so as to determine if the candidate point is the pre-defined object. In other words, If $(D_{t1}^2 < Th_{c1})$ AND $(D_{t2}^2 < Th_{c2})$, Then, the point is a pre-defined object Else, the point is not a pre-defined object (13)

where $Th_{c1}$ and $Th_{c2}$ are threshold values used for classifying categories. These are determined using the images of known objects and are stored in the file 7 beforehand.

Thus, the candidate points which have been obtained in the first step can be checked with high accuracy to determine whether or not they are pre-defined objects in the second step.

FIG. 7 shows the resultant images obtained by the process of this embodiment, in which (a) shows that taken at time $t_1$, while (b) illustrates that taken at time $t_2$. The image in FIG. 7(a) contains water areas, a residential area, and a grass land, while the image in FIG. 7(b) illustrates that a portion of the water area has been reclaimed and turned into a grass land.

If a user of the image analyzing system wants to detect the change in the water, detection is performed in the manner shown in FIG. 6.

(E) Input of image data and parameters

The satellite images 1A and 1B taken at different times, together with data representing an object which has changed and how the object has changed (in this embodiment, water area), are input from a keyboard 12.

(F) Normalization process 2

Similar to process (A) in the previous embodiment.

(G) Change detection process 3A

Similar to processes (B) to (D) in the previous embodiment.

(H) Precision classification 13

Several candidate points (hatched areas) are obtained, including the right one, as shown in FIG. 7(c).

Figure 8:
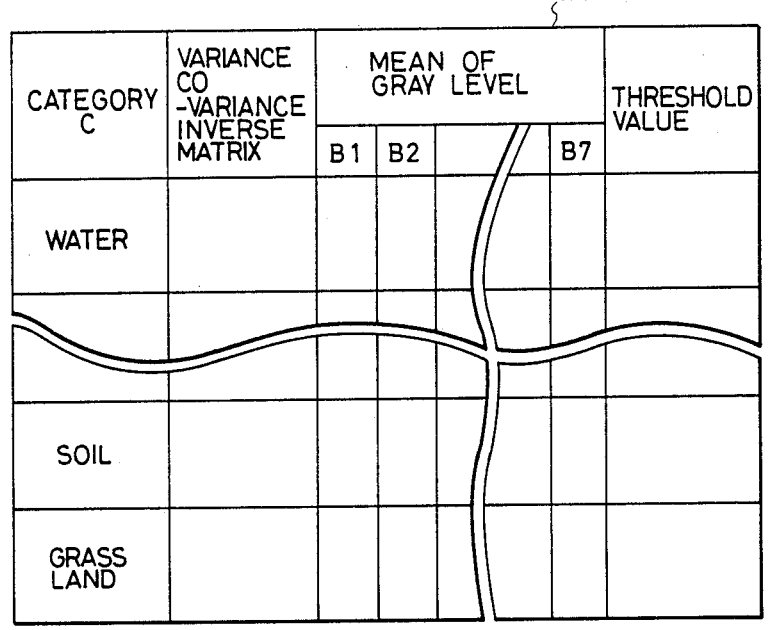
FIG. 8 shows a classification threshold value file.

(i) Mahalanobis' distance is calculated from the radiant intensity $II^{r1}$ of the image (a) taken at time $t_1$ which corresponds to each of the candidate points as follows:

$$D_{t2}^2 = (II^{r1} - \mu^{water})^T \underset{\text{water}}{\Sigma^{-1}} (II^{r1} - \mu^{water}) \quad (14)$$

where $$\underset{\text{water}}{\Sigma^{-1}}$$

is a variance/covariance inverse matrix of the training data on the water area, and $\mu^{water}$ is the mean vector of gray levels of the training data on the water area at each band. The inverse matrix $$\underset{\text{water}}{\Sigma^{-1}}$$

and the mean vector $\mu^{water}$ are obtained beforehand from the image of known objects and are registered for each category as classifying threshold value data shown in FIG. 8.

(ii) It is then determined using the following conditions whether or not the calculated Mahalanobis' generalized distance belongs to the pre-defined category.

If $D_{t1}^2 < Th_{water}$

Then, the point is a pre-defined object

Else, the point is not a pre-defined object (15)

The used classifying threshold value $Th_{water}$ is the one which has been obtained from the known data in the same way as in (i) and has been stored in the file 7A.

(I) Display of detection result

As shown in FIG. 7(d), the changed portion in the classification result obtained by Equation (13) is set to a high gray level while the non-changed portion is set to a low gray level to display the changed portion separately from the non-changed portion, and the result is output to the display 6.

In this embodiment, candidate points are first calculated using the data on the magnitude and direction of the changes in the spectral characteristics of the objects, and a statistical classification process is then conducted to the calculated candidate points so as to enable them to be determined as pre-defined objects or non predefined objects, thereby enabling highly accurate detection of the pre-defined object.

In either of the above-described embodiments, multispectral images are used in which the wavelength or spectrum changes with time. However, the present invention is not limited to those, and are applied to the detection of a morbid portion in a medical image in which a plurality of relaxation times are available, such as an NMR image.

As will be understood from the foregoing description, the present invention provides a change detection method that uses an image which is capable of detecting the contents of the change in the object with high accuracy.

When a statistical category classification process is conducted to the claculated changed points, the contents of the change in the object can be detected with a higher accuracy.

What is claimed is:

1. A method of detecting a change using input images taken at different times by detecting any change in corresponding pixels representative of said input images, said change detecting image method including an image inputting section, an image registration processing section, a binarization processing section, and an image display section, wherein the method comprises:

a step of calculating differences in vectors of a plurality of images which are based on different image characteristics, the vectors being representative of a change in image characteristics of various objects in the image data and classifying the image characteristics into statistical categories such that candidate areas are extracted by calculating a change in direction in the vectors of an object and by comparing said direction with predetermined training data, and conducting a statistical category classification process on said candidate areas alone so as to detect the change in said object.

2. A change detection method using an image according to claim 1, wherein said plurality of images which are based on the different image characteristics are multispectral images, and said image characteristics are wavelength characteristics.

3. An image analyzing system for detecting a change in an object from multitemporal images, comprising:
   a first means for inputting first image data obtained by taking a picture of said object at a certain time;
   a second means for inputting second image data obtained by taking a picture of said object at a time different from said certain time;
   a third means for performing registration on said first and second image data;
   a fourth means for calculating the magnitude of difference and direction of change in vectors representative of a change between said first and second image data on which registration has been performed;
   a fifth means for storing threshold values obtained from known detail data on said object;
   a sixth means for detecting the change in said object from the relationship between said magnitude of said vector difference and said direction of change with said threshold value; and,
   a seventh means for adjusting levels of brightness so as to correct the atmospheric conditions of said first and second image data.

* * * * *